United States Patent [19]

Ishikawa

[11] 3,836,154

[45] Sept. 17, 1974

[54] AUTOMATIC CASSETTE RECORDER REPRODUCER

[75] Inventor: Mitsuo Ishikawa, Okaya, Japan

[73] Assignee: Bell & Howell Company, Chicago, Ill.

[22] Filed: Mar. 13, 1973

[21] Appl. No.: 340,786

[30] Foreign Application Priority Data

Apr. 4, 1972 Japan ............................... 47-33786

[52] U.S. Cl. ........................................ 360/92

[51] Int. Cl. ........................................ G11b 5/00

[58] Field of Search............ 274/4 F, 4 R, 4 B, 4 C; 242/198; 179/100.2 Z

[56] References Cited

UNITED STATES PATENTS

| | | | |
|---|---|---|---|
| 3,603,597 | 9/1971 | Haake | 274/4 F |
| 3,722,892 | 3/1973 | Haake | 274/4 F |
| 3,770,282 | 11/1973 | Ryan | 274/4 F |

*Primary Examiner*—Leonard D. Christian
*Attorney, Agent, or Firm*—Roger M. Fitz-Gerald; Jack C. Berensweig; Leon B. Waguespack

[57] ABSTRACT

A tape recorder-reproducer having an improved mechanism for loading any one of a plurality of cassettes from a magazine into a holder means for rotating the holder means to invert the cassette to position each of two magnetic tracks on a tape in an effective position for recording or reproduction, for unloading the cassette from the holder means into the magazine and for advancing the magazine to permit repeating the cycle. In addition, the improved mechanism enables the cycle to be stopped and allows any cassette to be repeated continuously, automatically.

9 Claims, 20 Drawing Figures

AUTOMATIC CASSETTE RECORDER REPRODUCER

BACKGROUND OF THE INVENTION

The present invention relates generally to tape recorder-reproducers or the like, and more particularly, is directed to an improved apparatus for handling and automatically playing a plurality of conventional tape cassettes in a preselected sequential order.

A first previously designed tape recorder-reproducer having a mechanism operable to sequentially place each of a plurality of cassettes into an effective position and operable to invert the cassette to position each of two magnetic tracks in the effective position is disclosed in U.S. Letters Pat. No. 3,603,597, issued to Robert Haake on Sept. 7, 1971 and assigned to the same assignee of this application. In this recorder-reproducer, cassettes are vertically stored in a non-indexing storage bin and it is capable of placing only the cassette located at the bottom of a stack of cassettes in an effective play position. To place a specific cassette other than the bottom one in the effective position, the mechanism must operate through the loading, inverting and unloading cycle for each cassette until the specific cassette is located on the bottom. Furthermore, the stacking of several cassettes in a vertical orientation requires the product to be designed with a high profile. This high profile is an undesirable appearance relative to the present demands for low profile products.

A second previously designed tape recorder-reproducer is disclosed in U.S. Pat. application Ser. No. 50,601, filed June 29, 1970 now U.S. Pat. No. 3,722,892 and assigned to the same assignee of this application. In this second recorder-reproducer, an indexing storage magazine for the cassettes is provided. The cassettes are sequentially removed from the storage magazine by a loading means. The loading means places the cassette into a carrier means which is operable to place the cassette into a play position to reproduce the first track and then rotate the cassette 180° to reproduce the second track. After both tracks have been reproduced, the cassette is automatically replaced into storage magazine. The storage magazine is then indexed and the procedure repeats itself.

The present invention is similar in function and mode of operation to the recorder shown in said U.S. application Ser. No. 50,601 but differs in the specific mechanism used to effectuate these functions. In addition, the present invention provides a unique means whereby a preselected cassette may be continuously replayed without being returned to the storage magazine.

SUMMARY OF THE INVENTION

The general purpose of this invention is to provide an improved mechanism for a tape recorder-reproducer that is able to automatically play or reproduce a plurality of conventional tape cassettes in a preselected order wherein all of the record tracks on a first cassette may be reproduced before reproducing the record tracks on a second cassette.

In operation, a plurality of conventional cassettes are housed in a magazine and each cassette is individually removed from the magazine and loaded on the tape recorder to play. After completing plays of the first record track, the cassette is automatically reversed and the second track is reproduced. Subsequently, the first cassette is returned to the magazine and the magazine is then indexed to allow the first track on the second cassette to be reproduced. When all the cassettes in the magazine have been played, the magazine automatically returns to its initial position to allow the first cassette to begin playing and this cycle may be continuously repeated.

An additional feature is provided which enables a preselected cassette to be continuously replayed automatically without being returned to the magazine.

Manual operation of the recorder is also possible as in the conventional tape recorder to effect fact feeding or rewinding of tape. Also, reversal or exchange of any cassette or non-sequential operation is possible with manual operation.

DESCRIPTION OF THE PREFERRED EMBODIMENT OF THE INVENTION

Figure 1:
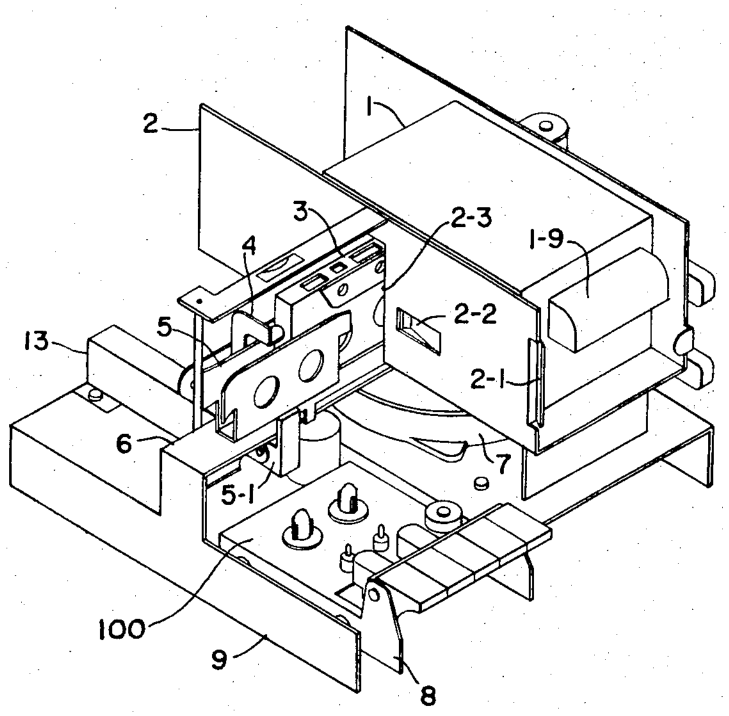
FIG. 1 is a perspective view of one embodiment of the present invention.

Referring now to the drawings wherein like reference numerals designate like or corresponding parts throughout the several views, there is shown in FIG. 1, which illustrates a preferred embodiment of the invention, a magazine 1 housing a plurality of conventional cassettes. A magazine guide 2 is provided for guiding the magazine during its forward and reverse indexing. A cassette 3 is shown being removed from the magazine 1. A carrier 4 is provided for removing the cassette from the magazine and carrying it to a relay position on the tape recorder and for again returning the cassette 3 to the magazine 1. A holder 5 is provided for holding a cassette 3 when it is loaded or withdrawn from the magazine and placed on a play station 100 on a tape recorder 8. A rail 6 is provided for guiding the movement of the carrier 5. A main disc 7 (shown in greater detail in FIG. 3) having a plurality of cams along its circumferential wall which are correlated with a plurality of levers effecting the sequential operation of the holder 5 and the carrier 4. Lastly, a conventional tape recorder 8 is mounted on a base 9 and the position of the play station 100 on the tape recorder 8 is correlated to the movements of the holder 5 and the carrier 4.

Figure 2:
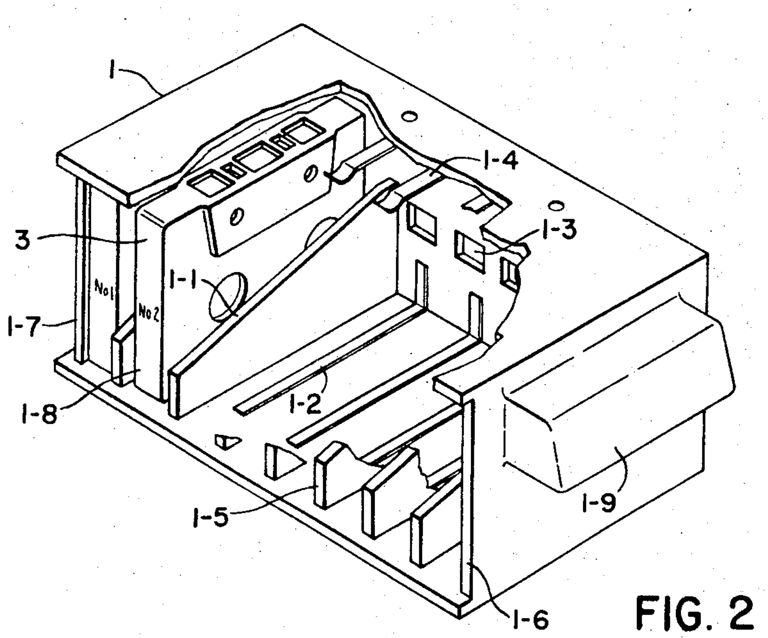
FIG. 2 is a perspective view of a magazine shown in FIG. 1, partly cut away.

FIG. 2 shows the magazine 1 in greater detail. The magazine 1 is made of suitable material such as plastic and has one open side which allows cassettes to be moved in and out. Inside of the magazine 1 are a number of partition plates 1—1 which are provided to align the cassettes and also prevent the cassettes from being placed within the magazine in an upside-down orientation. While FIG. 2 shows space for only eight cassettes, it will be recognized that this number may be suitably increased or decreased. The bottom of the magazine is provided with slots 1–2 which allow the carrier 4 to pass through for removing the cassette.

At the side opposite to the open side of the magazine, holes 1–3 are provided to enable the magazine to be advanced or indexed step by step. At the top of the magazine, leaf springs 1–4 are provided to hold the cassettes in position. It will be noted that the ends 1–5 of each partition plate, the ends 1–6, 1–7 of side boards, and the end 1–8 of the cassette are arranged in a manner such that they are recessed with respect to the open end of the magazine 1.

After the magazine 1 has been inserted into the magazine guide 2, an inwardly directed projection 2-1 (FIG. 1) provided at the entrance of the magazine guide will prevent the magazine 1 from moving any further rearwardly. In addition, a projection 2—2 (FIG. 1) on the side wall of the magazine guide 2 corrects any misalignment of the cassettes within the magazine. A handle 1–9 is also provided on the magazine to facilitate removal of the magazine 1 from the magazine guide 2.

The operation of the recorder will now be explained with reference to the drawings. First, the cassettes 3 are placed within the magazine 1 as shown in FIG. 2. The magazine 1 is pushed inwardly into the magazine guide 2 in a manner so that the first cassette aligns with the aperture 2–3 in the magazine guide 2. When this occurs, the main disc plate 7 (FIG. 3) which governs the various movements is in a first stop position and its projection 7-1 at the bottom contacts a switch SA (FIG. 15) to provide power to a motor 10. A transportation gear 11 engages a row of teeth 7-2, which are provided around a quarter of the interior of disc 7, and moves the carrier 4 with a cassette 3 therein to a relay position B (FIG. 4) from an intermediate position A which is displaced to the left from the position D, which represents the maximum limit of travel of the carrier. It will be noted that the distance between 4-1 and 4-2 through which the cassette is inserted into the carrier is larger than the width of the cassette, and the position where the carrier stops is set so that the cassette is free from the points 4-1 and 4-2 and will not interfere with the subsequent movement of the carrier.

Figure 6:
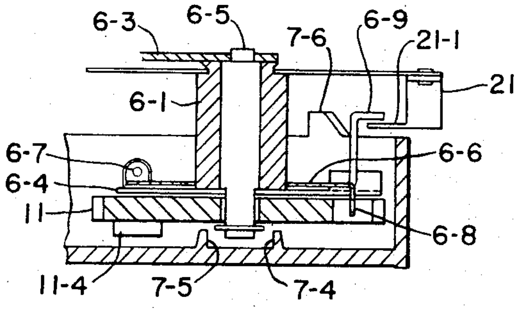
FIG. 6 is a section view of transmission mechanism shown in FIG. 5.

Now when switch $S_1$ (FIG. 15) is closed, the motor begins to rotate and this is transmitted through suitable speed reduction means 10-1, 10-3 to the gear 7-3 provided at lower circumference of the main disc 7 which rotates in the direction shown by the arrow. A slip means 10-2 is provided to prevent the main disc and other means from imparting too large a torque or force. The carrier 4 moves on the rail 6 to transport the cassette between the magazine and the relay position. This movement is effectuated by the link 12 which is connected by a pin 6-2 to a crank lever 6-3 and to the carrier by a pin 4-3. The crank lever 6-3 oscillates about a bearing 6-1 connected to the rail 6. The crank lever 6-3 is rotated by transmission gear 11 through an axis 6-5. A clutch means is provided to allow the rotation of the crank lever to stop even though transmission gear 11 continues to rotate. This is shown in FIG. 6. At the side of the transportation gear 11, a clutch plate 6-4 is rockably provided. A clutch 6-6 which is rockable about hinge axis 6-7 is also provided. One end of the clutch 6-6 is bent into a nail 6-8 and fits into a recess 11-1 of transportation gear 11. The other end 6-9 of the clutch 6-6 forms a projecting arm and by raising it, the nail 6-6 may be raised out of the recess 11-1. Normally this nail 6-8 is engaged in the recess 11-1 and the rotation of transportation gear is then delivered to the crank lever 6-3.

When the main disc 7 begins to rotate in the direction of the arrow, the transportation gear engages with the inside teeth 7-2 of disc 7 and rotates. The carrier 4 is moved from the position A to the position B in FIG. 4 and thus, the cassette 3 is moved from the magazine to the relay position B. In this relay position, the cassette is inserted into the holder 5 (FIG. 1).

The following relationship exists between the gear 7-2 and transportation gear 11. When the main disc 7 makes one revolution, the transportation gear 11 also makes one revolution. When the carrier is moved to the position B in FIG. 4 by the rotation of transportation gear 11, the last tooth 7-2'' of the main disc (FIG. 5) is about to leave the last tooth 11-3 of the transportation gear 11. Even when the main disc 7 continues to rotate, the transportation gear remains stationary as the section of the main disc rotates around, having no teeth. The transportation gear 11 has at its underside a projection 11-4 and this is to be pinched between the two concentrical walls 7-4, 7-5 of the main disc 7. When said transportation gear comes out of engagement, this prevents the transportation gear from having random movement during the non-engagement period of the gear along the walls 7-4, 7-5. During the time when the transportation gear halts and only the main disc is rotating, actions of loading, playing and reversion of cassette are performed by cams on the outer circumference of the main disc. When a series of these actions are completed and the cassette is returned to its relay position, the teeth 7-2 of main disc again start to rotate the transportation gear.

Figure 5:
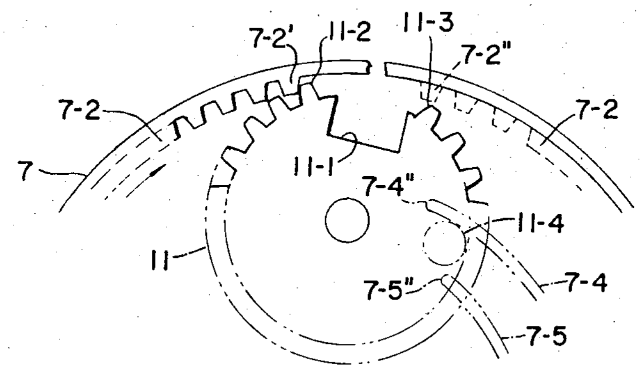
FIG. 5 is an enlarged diagrammatical view of a portion of the mechanism shown in FIG. 3.

FIG. 5 shows the position of the elements when the first tooth 7'-2 of the main disc begins to engage the first tooth 11-2 of the transportation gear. It is desirous that the teeth mesh sufficiently deep, if not, the second tooth of transportation gear might engage or ride over the partner tooth causing a problem. To accomplish this, the adjacent tooth of the transportation gear is eliminated so that the respective row of teeth start to engage securely even though they are in a displaced position and when their meshing beings, the projection 11-4 of the transportation gear 11 rotates free from the rear ends 7-4'' and 7-5'' of respective arcuate walls 7-4 and 7-5.

Figure 7:
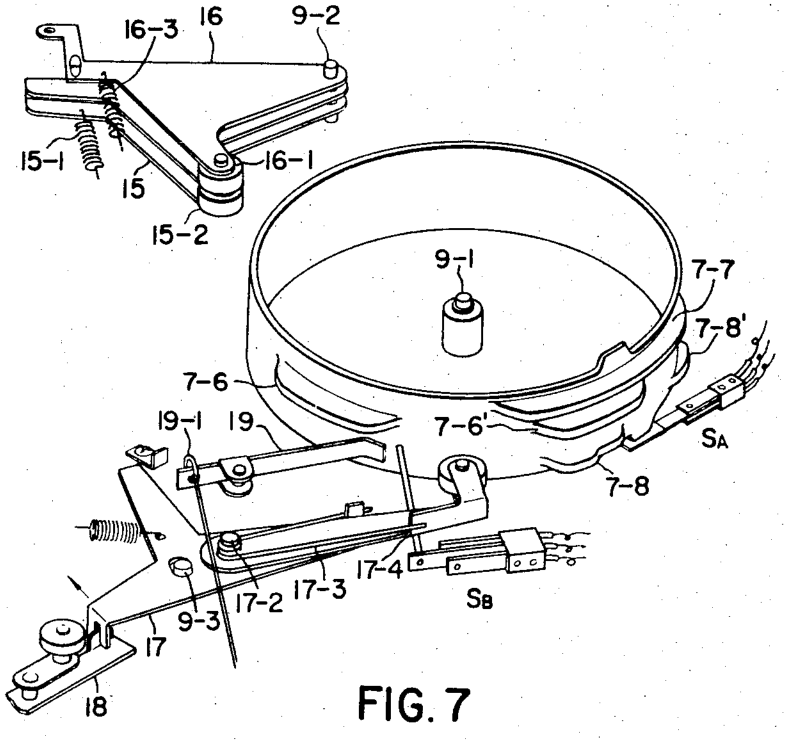
FIG. 7 is a perspective view of the main disc and its cooperative means to effect loading, unloading and reversing of the cassettes and the advancing of recorder head plate to play each of the tracks of the cassette.

FIG. 7 is an exploded view which shows an assembled lever 15 which allows the cassette to be loaded and reversed and which also advances the head. A lever 15 is urged toward the main disc 7 by a spring 15-1 about the axis 9-2 planted on the base 9. A roller 15-2 engages with cams 7-6, 7-6' provided on the circumferential wall of the main disc 7 which rotates about the shaft 9-1 planted on the base 9. When the roller 15-2 is pushed back by the cams 7-6, 7-6', the cassette is loaded onto the tape recorder. A lever 16 cooperates with a main disc 7 to reverse the cassette 180° and is always urged toward the disc by a spring 16-3. A roller 16-1 engages the cam 7-7 of the main disc 7. A lever 17 is provided to advance the head base plate 18 which includes the head and pinch roller to effect playing of the tape.

Figure 8:
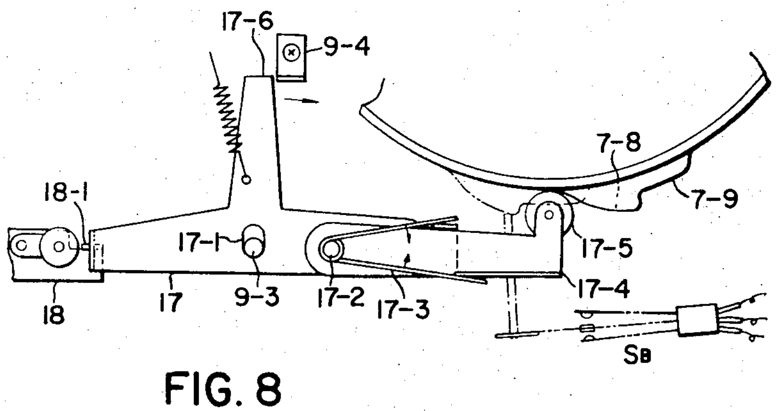
FIG. 8 is a plan view of a portion of the mechanism shown in FIG. 7.

Referring to FIG. 8, the lever 17 is substantially T-shaped, one end of which engages the head base plate 18 and the other end engages a cam 7-8 through a roller 17-5. The roller 17-5 is pivotally mounted to a lever 17-4 which moves together with the lever 17 caused by a spring 17-3 attached to a pin 17-2 attached to the lever 17. If the lever 17 becomes unable to move and the roller 17-5 is pushed, the lever 17-4 alone will move against the force of the spring 17-3 to prevent its damage. The third arm of the lever 17 extends in a direction at a right angle relative to the other two arms. A slot 17-1 is provided substantially at the center portion of the two arms and extends along the third arm. A pin 9-3, planted on the base 9, extends through the slot 17-1 so that the lever 17 is pivotable around it, though it is lightly pulled to the direction of the third arm 17-6. Near the end of the third arm 17-6, a stopper 9-4 is provided to stop the clockwise turning of the lever 17.

When the cam 7-8 begins to contact and push the roller 17-5, the lever 17 is turned to the left around the engaging point with the head base plate 18 as its center and is moved due to the loose fit of the slot. In this direction, the stopper 9-4 does not prevent the rightward turning of the arm end 17-6. As the cam further pushes the roller, the lever 17 rotates around the stud 9-3 and thus the head base plate 18 is advanced. Upon the head reaching the position to effectuate the playing of tape, a conventional coupling plate (not shown) acts to allow the tape recorder to play. When the cam 7-8 stops pushing the roller 17-5, it immediately presses the switch $S_B$ and stops the rotation of the main disc 7. The cam 7-8 is followed by a cam 7-9 which has a low working face and this cam is now in a position to engage the roller 17-5.

When the tape recorder is rendered STOP.FF.REW. by manual operations and even after the head 18 is returned, the cam 7-8 still engages the roller and the lever 17 is displaced rotatably to the right. Therefore, when the head base plate 18 is to be advanced manually, the lever is freely rotatable and will not prevent the manual operation. However, if the play button is pressed when the main disc is in any other position (with intention of advancing the head) it is impossible at that time since the rotation of the lever 17 to the right is prevented by the stopper 9-4.

Figures 9, 10:
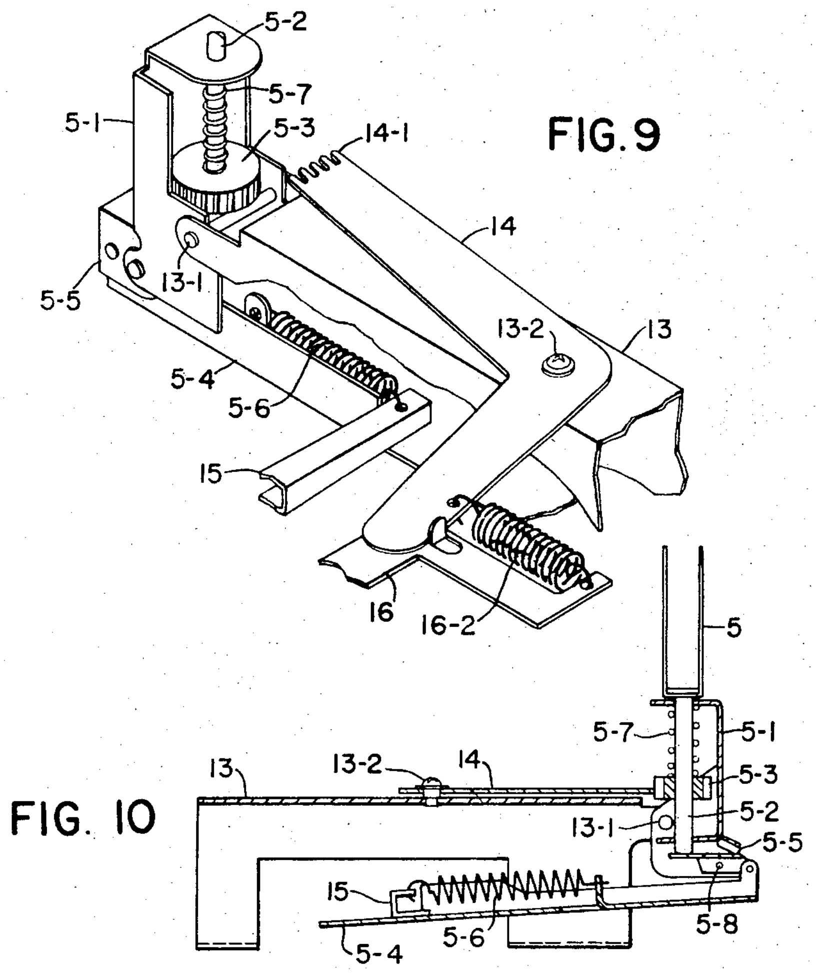
FIG. 9 is a perspective view of a portion of the mechanism utilized to effect loading and reversing of the cassette.
FIG. 10 and FIG. 11 are side sections showing the operation of the mechanism shown in FIG. 9.
Figure 11:
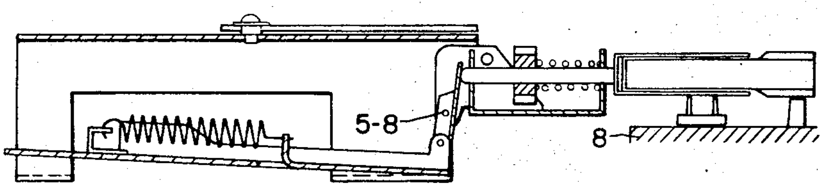

FIGS. 9, 10 and 11 show a mechanism to effect loading of the cassette from the relay position onto the tape recorder and its removal from the tape recorder. As mentioned previously, the frame 13 is mounted on the base 9. A holder 5 and its axis 5-2 is provided to hold the cassette. The holder 5 is pivotally mounted to a bearing 5-1 which is attached to one end 13-1 of the frame 13 and is rotatable 180°. A link 5-4 is connected through the loading lever 15 and a spring 5-6. The other end of this link is rockably connected to a pivotal plate 5-5.

As shown in FIG. 10, the holder 5 is normally in the relay position and when a cassette is delivered by the carrier to the holder, the loading lever 15 is pushed back by the cam 7-6 of the main disc 7 and this in turn, pulls the link 5-4 to the left in FIG. 10 whereby the holder is pulled down to the right whereby the cassette is loaded on the tape recorder as shown in FIG. 11. Even after the cassette is loaded, the lever 15 still pulls the link 5-4 so that the plate 5—5 rotates around the axis 5-8 provided by the holder bearing and the holder is forced to the right against the spring 5-7 thus the cassette is correctly pushed to the playing position of the tape recorder. When cam 7-6 of the main disc has rotated past, the loading lever is returned by the spring 15-1 and the lever 15 pushes back the link 15-4 to the right thereby returning the holder to the relay position.

L-shaped lever 14 is pivotally mounted at its center to the frame 13 and one end is connected through a spring 16-2 to the reversing lever 16. The other end of the lever 14 forms a rack 14-1 to engage a gear 5-3 mounted to the axis 5-2 of the holder. When this reverse lever 16 is pushed back by cam 7—7 of the main disc 7, the lever 14 is turned to the left through the spring 16-2 and the rack 14-1 thereby rotates the gear 5-3. In turn, the holder 5 is rotated 180°. When the cam 7—7 rotates past, the reverse lever 16 is rotated 180° by the force of the spring 16-2 to its original position and the holder 5 is also rotated 180° to its original position. The holder 5 then receives a cassette transported by the carrier 4. To load a cassette correctly on the tape recorder 8, it should be parallel to the direction of the movement of carrier. To rotate the holder 5 relative to the holder axis, a suitable knob (not shown) may be provided.

The order of operation of the above mechanism will now be described in detail. When a cassette is inserted by the carrier 4 into the holder 5, the cam 7-6 pushes the loading lever 17 thereby pushing the cassette slightly forward in the holder and loading the cassette in a predetermined position onto the tape recorder. The cam 7-8 pushes the lever 17 thereby advancing the head into a play position with respect to the tape and the tape begins to play. Immediately after the cam 7-8 has finished pushing lever 17, switch $S_B$ is pressed thereby de-energizing the motor circuit and stopping the rotation of the main disc. However, the playing of the tape continues. After the playing of the tape is finished, switch $S_H$ (FIG. 15) provided on the tape recorder for detecting the end of play of the tape, turns on and the main disc again begins to rotate. The cam 7-8 then pushes the release lever 19 (FIG. 7) and the coupling plate (not shown) of the tape recorder is released through the link 19-1 and the head base plate 18 returns to its original position.

Thereafter the rear end of the cam 7-6 arrives in position at the roller 15-2 of loading lever 17 and as the cam rotates away, the cassette is pushed slightly back into its original position in the holder 5 and returned to the relay position. Then the cam 7—7 drives the reversing lever 16 and the cassette is rotated 180° and the cycle then repeats. Under this condition, cams 7-6' and 7-8' having the same working effective face as the preceding cams 7-6 and 7-8 respectively, effect the same order of the loading of the cassette, advancing of the head plate, playing, retreat of the head plate and returning to the relay position. When the cassette is returned to the relay position, the rear end of cam 7-7 reaches the roll 16-1 of the reversing lever 16 and as the cam rotates, the cassette is again rotated 180° to its first position.

When one cycle is over, the first tooth 7-2' of the row of teeth 7-2 of the main disc begins to rotate the transportation gear 11. The carrier holds the cassette and returns it again to the original position in the magazine.

Figure 3:
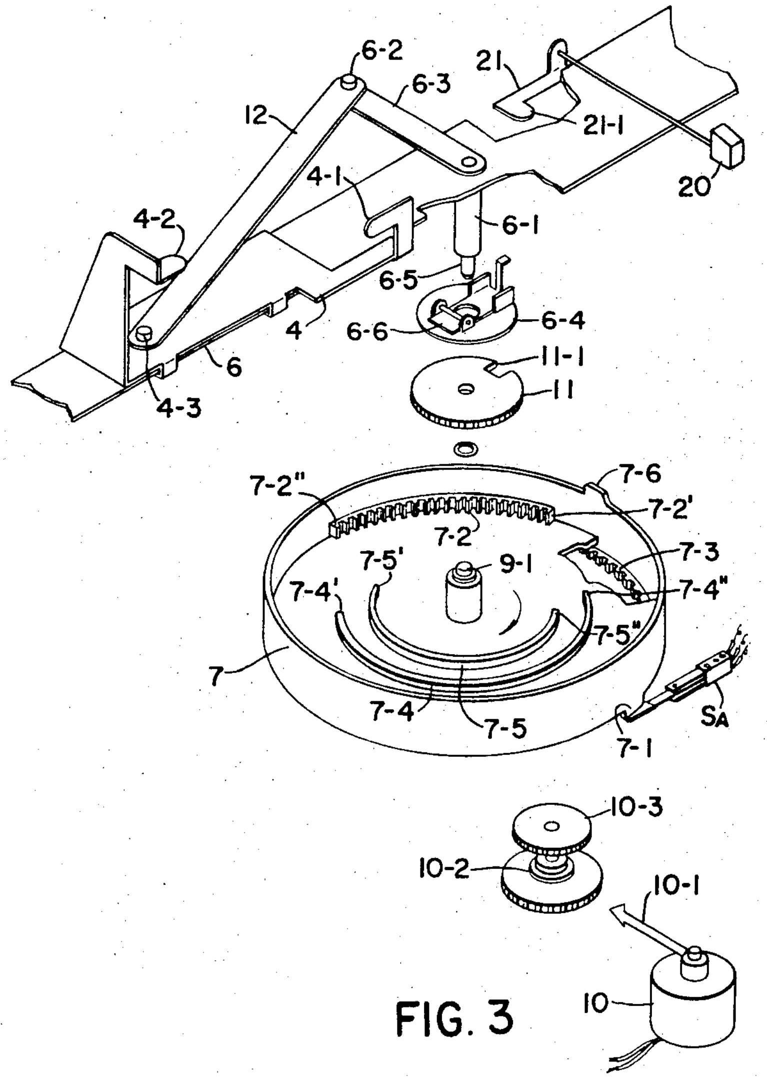
FIG. 3 is an exploded view of transportation mechanism for removing cassettes from the magazine shown in FIG. 2.
Figure 4:
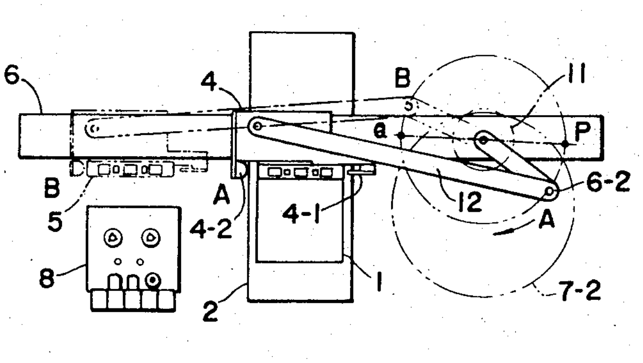
FIG. 4 is a plan view of transportation mechanism showing two positions of the carrier shown in FIG. 3 for taking out and returning a cassette from and to the magazine.

If the knob 20, shown in FIG. 3, is pulled to one side, the end 21-1 of an idler piece 21, which is rotatably and rockably mounted to the rail 6, enters the circumferential wall of the main disc 7 and lies under the arm 6-9 of the clutch 6. Just before the transportation gear begins to rotate due to the rotation of the main disc, the lobe 7-6 of the main disc lifts the idler piece 21 upwardly thereby lifting the arm of the clutch thus releasing the transportation gear 11 from the clutch plate 6-4. With the rotation of the main gear, the transportation gear begins to rotate. However, since the clutch has been released, the crank lever 6-3 will not move and the carrier remains stationary. Even after the lobe 7-6 of the main gear has rotated away and the arm of the clutch comes down, it only slides over the top face of the transportation gear and does not cause rotation allowing the recess 11-1 of the transportation gear to receive the clutch nail 6-8. When the knob 20 is pushed back, the clutch will engage the gear during the next opportunity after one revolution of the main disc. So long as the knob 20 is pulled out, the same cassette will repeatedly play both tracks of the tape.

When a cassette is returned to the magazine and approaches almost the original position, the pin 6-2 at the apex of the crank lever 6-3 engages with a toothed plate 22 for moving the magazine (FIG. 13) and rotating it clockwise as much as one tooth. This magazine drive plate together with a magazine drive gear 24 and detent teeth 25 is coaxially mounted to a shaft 23 and is rotatable along the side wall of the magazine guide 2. These are urged in a counterclockwise direction as shown with an arrow by a coil spring 26 and the magazine tends to be driven outwardly by the magazine drive gear 24 meshing with apertures 1-3 of the magazine. From near one end of the magazine side wall 2, a pivotable stop lever 2-4 extends downwardly and engages, through a spring 2-5, the detent tooth 25. Rotation is stopped by the spring 26, and in this position, the cassette is registered to the port 2-3 of the magazine.

As the crank pin 6-2 drives the magazine driving plate by one tooth, the magazine drive gear 24 drives the magazine inwardly by one step. After the carrier has transported a cassette into the magazine, it moves a bit to the left in FIG. 4 and halts at the position A. As mentioned previously, there is a gap between the carrier and cassette and it will not interfere with the driving of the magazine.

Figure 15:
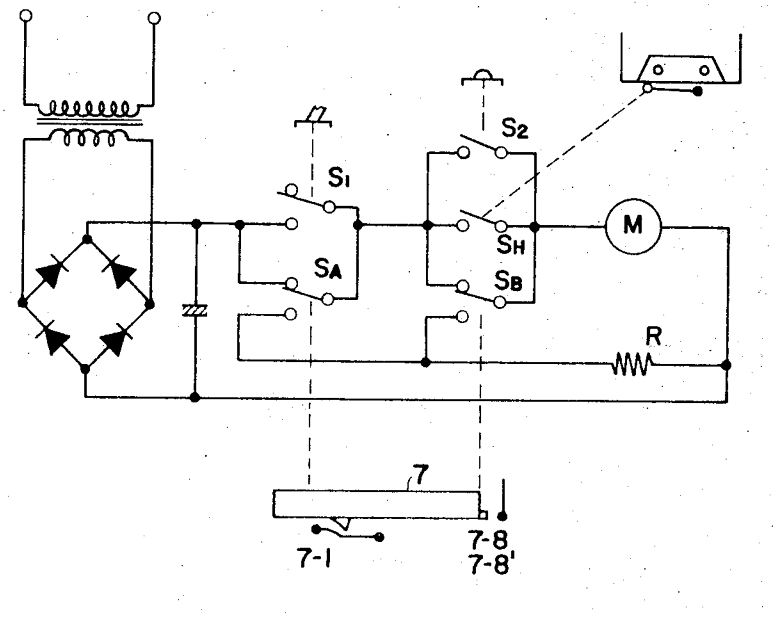
FIG. 15 is an electrical schematic diagram of the control circuit for recorder shown in FIG. 1.

Thus, automatic operation has been accomplished in that a cassette has had both recording tracks played and the next cassette is then brought to the position of the preceding cassette. However, if the switch $S_1$ in FIG. 15 is kept on, the second cassette will be brought to play automatically in the same manner and thus, all the cassettes are brought to play successively.

Figure 14A:
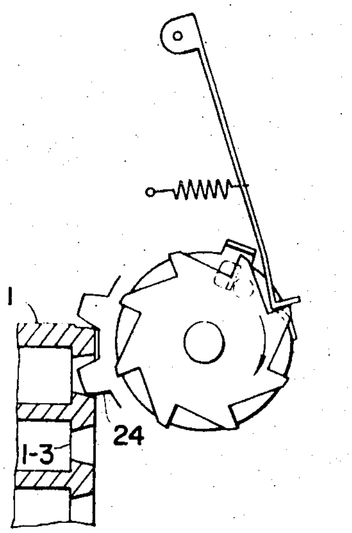
FIGS. 14A and 14B are plan views showing the operation of a portion of the mechanism shown in FIG. 13.
Figure 14B:
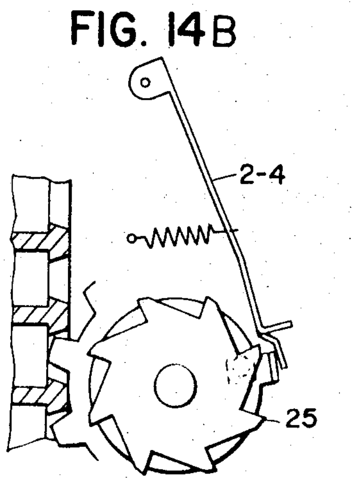
Figure 14C:
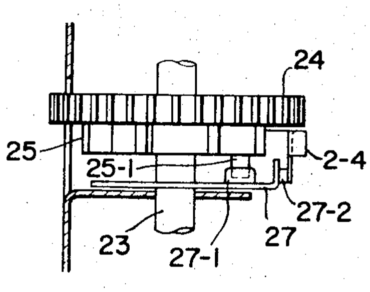
FIG. 14C is a side view of a portion of the mechanism shown in FIG. 13.

FIGS. 14A, 14B and 14C show the sequence of the completion of playing the eighth or last cassette and beginning the play of the first cassette. When the first cassette is ready to play, the relative position of the magazine drive gear to the magazine drive plate is shown in FIG. 14A. A projection 25-1 extends from the under side of the detent teeth 25. Under these detent teeth 25, a disc 27 is rotatably mounted to the shaft 23. The disc 27 has a riser 27-1 and an outwardly extending arm 27-2. With the engagement of the projection 25-1 and the riser 27-1, rotation is delivered. As the magazine is driven from the position in FIG. 14A toward the inside, the projection 25-1 will gradually move one tooth at a time in the direction of the arrow. Thus, the magazine drive plate rotates until the position of the eighth cassette and when it comes to the position corresponding to the ninth cassette, the projection 25-1 pushes the riser 27-1 into the position as shown in FIG. 14B. As the arm 27-2 of the disc 27 pushes the stop lever 2-4 away, the stop lever now is unable to stop the return of the magazine drive gear with the force of spring 26. Therefore, the magazine comes out from the side. The projection 25-1 of the detent rotates in the direction of the arrow in FIG. 14B. After one revolution, it pushes the riser 27-1 of the disc from the opposite side into the position shown in FIG. 14A. The arm 27-2 of the disc will no longer be able to push the stop lever 2-4, whereupon the stop lever engages the detent tooth and remains in a position to enable the first cassette to play.

Figure 13:
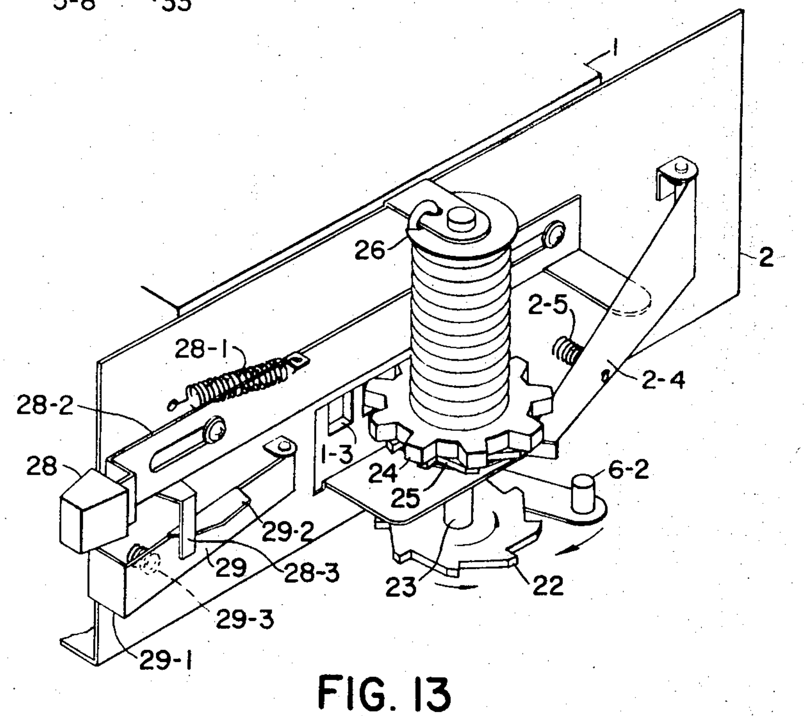
FIG. 13 is a perspective view of a mechanism for indexing the magazine shown in FIG. 1.

When the button 28 in FIG. 13 is pressed, a lever 28-2 is pushed against the force of the spring 28-1 and the stop lever 2-4 is urged to be pushed away. Thus, the detent is released from the stop lever and the magazine is further moved to the side and is fully disengaged from the magazine drive gear, whereupon the magazine may be removed by hand.

A lever 29 is pivotally attached to the side wall of magazine guide 2 and is urged outwardly by a spring 29-3. When the button 28 is pressed the are 28-3 extending from the lever 28-2 is advanced along a cam face 29-2 formed on the lever 29. The end 29-1 of the lever 29 thereby enters the path of the magazine. This prevents the magazine when it is returned with the pressing of button 28 from jumping out due to the severe force.

Figure 12A:
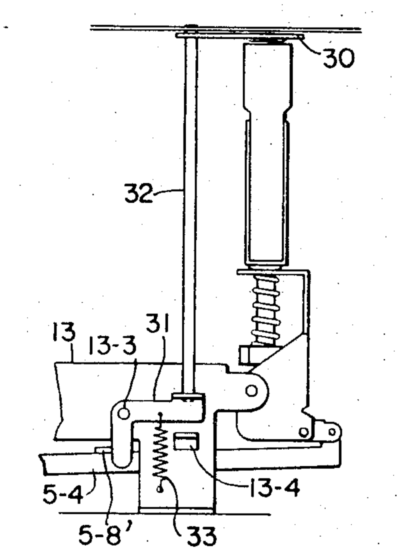
FIG. 12A is a side view of a mechanism for securely positioning a cassette in the holder shown in FIG. 1.
Figure 12B:
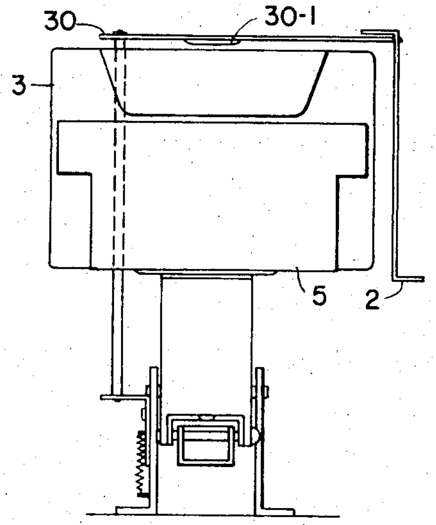
FIG. 12B is a front view of a mechanism for positioning a cassette securely in the holder shown in FIG. 1.

FIGS. 12A and 12B show a device for securely holding a cassette in the holder. The cassette which is inserted in the holder should be carried correctly to a predetermined position of the tape recorder. However, the cassette to be transported in the holder with the carrier is not always held securely in the holder and is often carried in a float condition. A holding plate 30 is fixed to the magazine guide 2 and has a ridge 30-1 at the position corresponding to the center of a cassette. The frame 13 has an L-shaped lever 31 pivotably mounted around a pin 13-3. One end of the lever is connected through a link 32 to the holding plate 30 and the other end is held by an arm 5-8' extending from the loading link 5-4. At the relay position, the holding plate 30 is to be removed from the cassette. However, when the link 5-4 is moved to the left for loading a cassette, the holding plate 30 is moved downwardly through the lever 31 and link 32 and into a position so that the cassette begins to move toward the tape recorder and the cassette will be properly inserted into the holder. A stopper 13-4 is provided to control the position of the holding plate when moving downward and a spring 33 pulls the holding plate downwardly.

FIG. 15 is an electrical schematic circuit which may be used in the preferred embodiment of the invention. A d.c. motor M is provided to rotate the main disc. A switch $S_A$ is normally closed and is adapted to be switched by the lobe 7-1 of the main disc 7 at the position A in FIG. 4 when the main disc halts. $S_B$ is also a normally closing switch. When the head 18 is advanced to begin playing of the tape recorder, it is switched with the cam 7-8 or 7-8' and thereby the main disc halts and playing goes on.

$S_H$ is a conventional switch which is used to detect the completion of the tape. After playing is over, the switch $S_H$ closes and causes the rotation of the main disc to allow its subsequent actions.

$S_1$ and $S_2$ are manual switches. $S_1$ is used to start from the initial stop position. If it remains closed, cassettes are successively replaced to continue playing. $S_2$ is used for rotating the cassettes 180° and for replacing the cassettes into the magazine at a predetermined period during playing. A resistor R is provided which acts as an electromotive brake through the use of the back EMF of the motor to allow for the rapid stoppage of the cams of main disc 7-1, 7-8, and 7-8' if necessary.

Figure 16A:
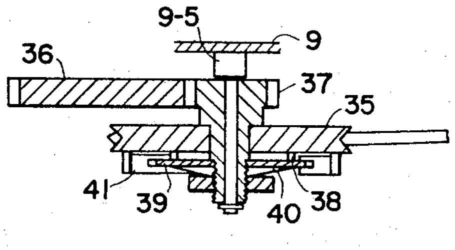
FIG. 16A is a side view of the safety mechanism used in the recorder.
Figure 16B:
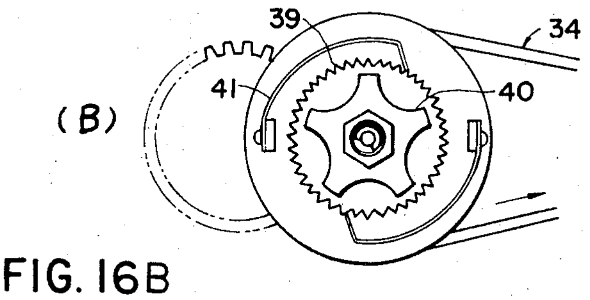
FIG. 16B is a plan view of the safety mechanism used in the recorder.

FIGS. 16A and 16B show the previously mentioned slip means for the speed reduction transmission mechanism and its particular application. Rotation of the motor is transmitted through the belt 34 to the pulley 35 and is speed-reduced further through gears 36 and 37 and drives the main disc 7. A comparatively small gear 37, rotatable around a shaft 9-15, is placed on the base 9. A pulley 35 is mounted as an idler. A friction disc 38 is coaxially mounted in a loose-fitted relation so as to be non-rotatable to the gear 37 and is urged by a pressure adjusting spring 40 toward the pulley. If the gear 36 is caused to stop rotating due to any accidental cause, rotation of the motor slows and a torque will be produced. This torque will increase thereby affecting the main disc to an extent so as to stop rotation. This occurs since the friction between the pulley 35 and the friction piece 38 is higher than that produced by pressure of an approximately adjusted spring 40.

A spring piece 41 is attached to the pulley 35, the tip of which is close to the teeth provided on the outer circumference of the main disc 39. As the pulley 35 and disc 39 normally rotate together, the spring 41 remains in the position shown. However, if the gear 37 stops due to an accidental cause, the disc 39 is also stopped and the pulley 35 alone continues its rotation in which instance, the spring piece 41 frictionally rotates on the teeth of the outer circumference of the main disc 39 with a loud noise thereby sounding an alarm. This alarm indicates the occurrence of an accident. By suitably increasing the pressing force of the spring piece to the disc, delivery may be made with the friction and thereby the friction piece 38 and and spring piece 40 are arranged to be close to the outer circumference of the disc. However, this may be made to contact to any projection provided on the disc face. Similarly, sound may be enhanced by placing a paper of suitable thickness and dimension in an appropriate place.

Obviously, many modifications and variations may be made herein without departing from the spirit and scope of the invention as set forth in the appended claims.

What is claimed is:

1. A tape recorder-reproducer having a record-play station including a head, for reproducing from a tape in a cassette, the tape having a first magnetic track and a second magnetic track, the second magnetic track being recorded in a direction opposite from the first magnetic track, the improvement comprising:

means for storing at least one cassette;

carrier means for removing one of said cassettes from said storing means;

holder means for receiving said cassette from said carrier means and for transporting said cassette to and from said play station;

a first rotatable disc means having a first, second, third and fourth cam means along its periphery;

first lever means operable by said first cam means for transferring said cassette from said carrier means to said holder means;

second lever means operable by said first cam means for placing said cassette located in said holder means onto said play station and operable by said second cam means for causing said tape to rotate and engage said head wherein said first track on said cassette is reproduced;

means for stopping the rotation of said first disc while said first track is being reproduced and means for starting the rotation of said first disc when the reproduction of said first track has been completed;

third lever means operable by said second cam means for stopping the rotation of the tape in said cassette and for causing said second lever means to remove said cassette from said play station; and fourth lever means operable by said third cam means for rotating said holder means 180° whereby said fourth cam means causes said second lever means to place said cassette in said play station thereby causing said tape to rotate and allowing said second track to be reproduced.

2. The improvement of claim 1 further comprising fifth lever means operably connected to said first disc means for enabling said carrier means to remove said cassette from said storage means and to cause said carrier means to replace said cassette in said storage means when said second track has been reproduced.

3. The improvement of claim 2 further comprising an indexing means operably connected to said first rotatable disc means for indexing said storing means after said cassette has been returned to said storing means.

4. The improvement of claim 3 further comprising clutch means associated with said disc means whereby said clutch means selectively prevents said fifth lever means from returning said tape to said magazine and enables said first and second tracks to be reproduced repeatedly.

5. The improvement of claim 4 wherein said first rotatable disc means further comprises gear means along a portion of its interior periphery.

6. The improvement of claim 5 further comprising a transportation gear means wherein said transportation gear means cooperates with said gear means of said first disc means to impart movement to said carrier means.

7. The improvement of claim 6 wherein said clutch means is operable to disengage said transportation gear means from said disc gear means when repeated reproduction of said tape is required.

8. The improvement of claim 7 wherein said carrier means comprise a resilient spring means for securely holding said cassette.

9. A tape recorder-reproducer having a record-play station including a head, for reproducing from a tape in a cassette, the tape having a first magnetic track and a second magnetic track, the second magnetic track being recorded in a direction opposite from the first magnetic track, the improvement comprising:

means for storing at least one cassette;

carrier means for removing one of said cassettes from said storing means;

holder means for receiving said cassette from said carrier means and for transporting said cassette to and from said play station;

means for transferring said cassette from said carrier means to said holder means;

means for placing said cassette located in said holder means onto said play station and for causing said tape to rotate and engage said head wherein said first track on said cassette is reproduced;

means for sensing the end of play of said first track, stopping the rotation of said cassette and removing said cassette from said play station;

means for rotating said holder means 180° and placing said cassette in said play station wherein said second track on said cassette is reproduced;

means for sensing the end of play of said second track and removing said cassette from said play station and returning said cassette to said carrier;

return means for enabling said carrier to return said cassette to said storing means; and clutch means selectively operable for preventing said return means from returning said cassette to said storage means and for causing said first and second tracks to be reproduced repeatedly.

* * * * *